United States Patent

Peterson et al.

[11] 4,014,365
[45] Mar. 29, 1977

[54] VALVE

[75] Inventors: Jerry D. Peterson, Conrad; Gerald L. Knief, Grundy Center, both of Iowa

[73] Assignee: Ritchie Industries, Inc., Conrad, Iowa

[22] Filed: Oct. 10, 1975

[21] Appl. No.: 621,468

[52] U.S. Cl. ................................ 137/549; 119/75; 251/339; 251/322; 251/323; 210/430
[51] Int. Cl.² ........................................... E03B 3/18
[58] Field of Search .......................... 210/429–432; 119/72.5, 75; 137/549; 251/210, 339, 322, 323

[56] References Cited

UNITED STATES PATENTS

| | | | |
|---|---|---|---|
| 1,314,566 | 9/1919 | Bogda | 210/430 |
| 1,747,442 | 2/1930 | Hutchings | 251/339 |
| 2,321,743 | 6/1943 | Guibert et al. | 137/549 X |
| 2,785,881 | 3/1957 | Dolan | 251/339 |
| 2,819,799 | 1/1958 | Wilkerson | 210/430 |
| 3,043,267 | 7/1962 | Blough | 119/75 |
| 3,286,979 | 11/1966 | Brown et al. | 137/549 X |

*Primary Examiner*—William R. Cline
*Assistant Examiner*—H. Jay Spiegel
*Attorney, Agent, or Firm*—Henderson, Strom & Sturm

[57] ABSTRACT

A valve of a type for use particularly in animal waterers. A valve body having a passageway extending therethrough has a valve stem disposed in the passageway. The valve stem has an enlarged portion on one end thereof having longitudinal slots therein and a valve head on the other end thereof for cooperation with a valve seat located at one end of the passageway of the valve body. A screen having perforate sides and an imperforate end is connected to the valve body and encompasses the valve head. A cylindrically shaped member is positioned inside of the screen and is sealed at one end thereof to the valve body and at the other end to the imperforate end of the screen. A single small hole passes through the cylindrical member at a place on the cylinder whereby the valve head must move past it during opening and closing thereof to thereby keep the opening from being closed due to the build-up of foreign particles or mineral deposits thereon.

2 Claims, 5 Drawing Figures

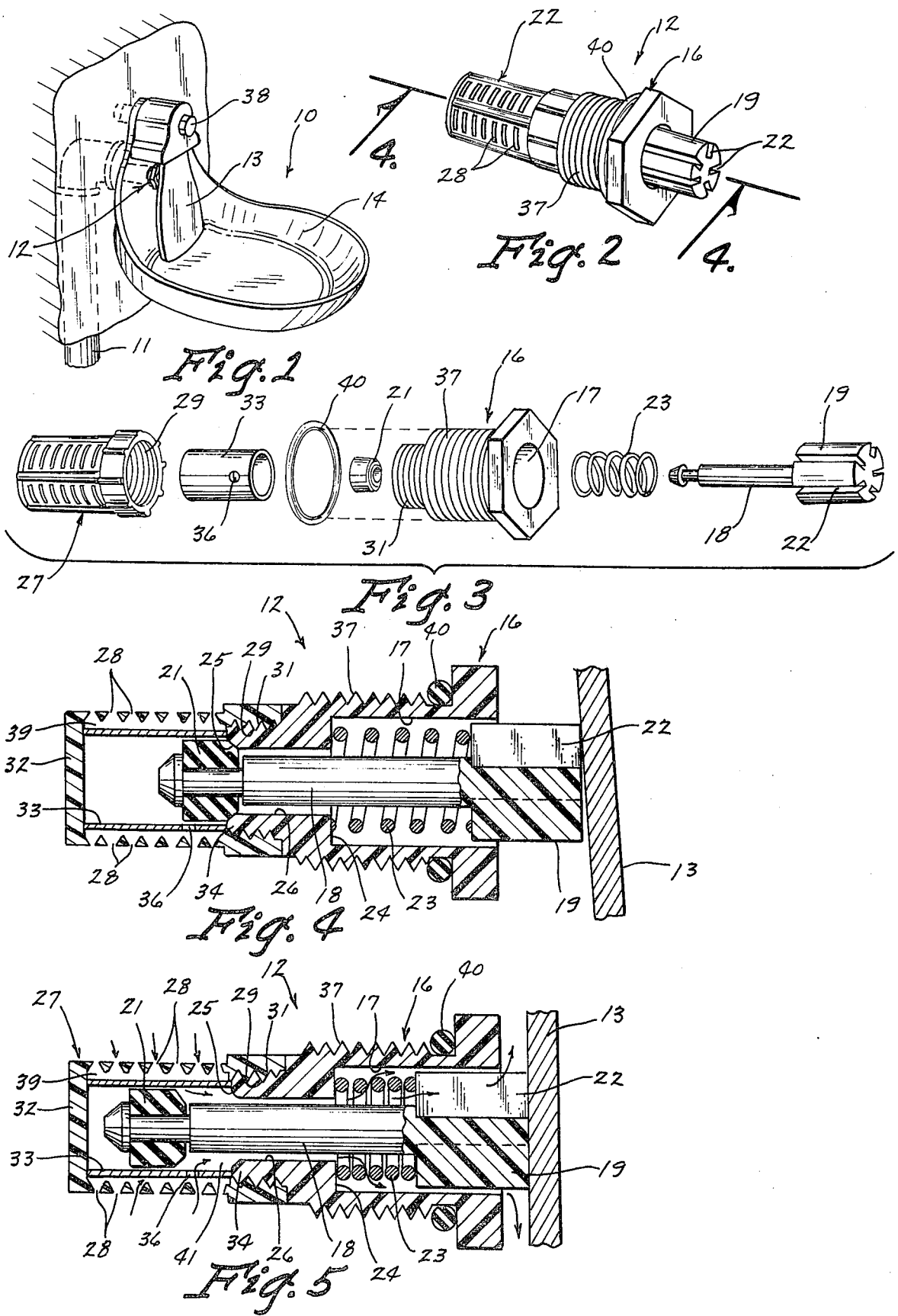

VALVE

BACKGROUND OF THE INVENTION

The present invention relates generally to valves and more particularly to valves for use in animal watering systems.

In animal waterers there is a need for a valve which is easily opened but yet which provides for a positive seal when the valve is closed. Typically, such a valve takes the form of a device for watering hogs whereby when a hog pushes its nose against the paddle, the paddle will open a valve to release water into a cup or container. If the flow of water is too great, it will splash out of the cup and is wasted. Furthermore, it is not desirable to have excess water present around the drinking area. If the flow through the valve is too slow, however, fewer animals can be accommodated at a single drinking station or fountain. It is therefore a problem in the art to achieve the proper flow for such animal watering devices.

Another significant problem in the design and use of valves for animal watering devices is that many times the water to be used is not as clean and free of foreign matter as would be the case if the water were to be used for human consumption. Such foreign particles would tend to clog the valve and prevent the proper flow if not to stop the flow completely. This problem can also exist even if the water is clean but has a high concentration of minerals therein. Mineral deposits will then tend to build-up within the valve. There is consequently a need to provide a valve for use in animal watering systems which will effectively prevent the build-up of foreign deposits or mineral deposits which would otherwise hamper the flow or operation thereof.

SUMMARY OF THE INVENTION

The present invention relates to a valve having a valve seat and a reciprocating valve head. An inlet chamber is formed around the valve head and is comprised of a valve screen for filtering out foreign objects in the liquid passing through the valve. The screen has a chamber formed by perforate side walls and an imperforate end. A substantially imperforate rigid, cylindrical member is positioned within the screen in sealing engagement with the imperforate end of the screen and in sealing engagement at the other end thereof with a portion of the valve body surrounding the valve seat. A relatively small hole located closer to the valve seat end of the cylindrical member allows a controlled flow through the valve and prevents surges of liquid when the valve is opened. The location of the hole also is such that the valve head moves closely past it during its movement between the open and closed positions, thereby preventing a build-up of foreign matter or mineral deposits in the hole.

An object of the present invention is to provide a dependable valve for use in animal watering devices.

Another object of the present invention is to provide a valve which effectively prevents surges of water therethrough and instead provides for a controlled and even flow.

A further object of the invention is to provide a valve for use in water systems which have a high concentration of minerals or foreign particles therein to prevent such particles or deposits from stopping or hampering the flow through the valve.

Still another object of the invention is to provide a compact valve which is easy to assemble and economical to manufacture.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of a typical hog watering device which would utilize the present invention;

FIG. 2 is a perspective view of a preferred embodiment of the valve of the present invention;

FIG. 3 is an exploded perspective view of the valve shown in FIG. 2;

FIG. 4 is a cross-sectional view of the valve taken along line 4—4 of FIG. 2 and showing the valve in a closed position; and FIG. 5 is a cross-sectional view like FIG. 4 but showing the valve in an open position.

DESCRIPTION OF THE PREFERRED EMBODIMENT

Referring now to the drawings wherein like reference numerals designate identical or corresponding parts throughout the several views, FIG. 1 shows a typical hog watering arrangement 10. In the watering apparatus 10 there is an inlet water pipe 11 which is connected to a valve 12, which valve 12 is the subject of the present invention. A paddle 13 is pivotally mounted along a horizontal axis at the top thereof and rests against an outermost portion of the valve 12. As will be described below, when the paddle 13 is moved rearwardly against the valve 12, then the valve 12 will be open to supply water to a cup or container 14.

Referring to FIG. 3, a valve body 16 having a passageway 17 extending therethrough, a valve stem 18 is disposed within the passageway 17 and has an enlarged end 19 on one end thereof and a valve head including an elastomeric seal 21 on the other end thereof. The enlarged portion 19 has a plurality of longitudinal slots 22 along the entire length thereof to allow flow from the passageway 17 to pass out of the valve and into the cup 14 when the valve is open. A coil spring 23 is disposed within the enlarged portion of the passageway 17 and is in abutment at one end of the enlarged portion at shoulder 24. The spring 23 is also in abutment at the other end thereof with the enlarged portion 19 of the valve stem 18.

The smaller portion of the passageway 17 is designated by the numeral 26 in FIGS. 4 and 5. At one end of the passageway 17 on the smaller diameter portion 26 thereof is a valve seating surface 25. A screen 27 having openings 28 therein to form perforate side walls thereof is threadedly attached to the valve body by threads 29 (FIG. 3). The threads 31 on the valve body 16 cooperate with the threads 29 on the screen 27 to form a seal. The end 32 of the screen 27 is imperforate as is shown in FIGS. 4 and 5. A cylindrical member 33 is disposed within the screen 27 and is sealingly engaged at one end thereof to the imperforate end wall 32 of the screen and is sealingly in engagement with a portion 34 of the valve body 16 which surrounds the annular valve seat 25. A single hole 36 is located in and passes through the cylindrical member 33.

In order to utilize the valve 12, the threads 37 on the valve body 16 are utilized to be threaded into an end section of the inlet pipe 11 of FIG. 1 until the O-ring 40 abuts the end of the pipe 11. Once this has been done, the paddle assembly 13 is bolted into place by the use of a bolt 38. In this initial position, the valve will be in the closed position as shown in FIG. 4 by virtue of the biasing compression coil spring 23. Once a force is applied against the paddle 13, such as by the force of an animal's nose, the valve stem 18 will move to the position as shown in FIG. 5 whereby the valve head 21 will be moved so that it is spaced from the annular valve seat 25. Once this has been done, the water can pass through the openings 28 of the screen 27 into an inner annular chamber 39. The size of the openings 28 are smaller than or equal to any of the flow passageways through the rest of the valve so that if any particle can pass through the openings 28, then such particle will also be passed completely through the valve. Once the water is in chamber 39, then it can pass through the single opening 36 in the cylindrical member 33.

It is noted that the hole 36 is located such that when the valve head 21 is spaced only slightly from the valve seat 25 that flow will not immediately rush out to cause an undesirable surge of water through the valve, but that only a slight amount of water will pass through the valve until such time that the valve head 21 is moved to the position shown in FIG. 5. At such time, then a chamber 41 is formed around the valve stem 18 within the cylindrical member 33. Consequently, the water passing into and through the hole 36 will be directed into this enlarged chamber 41 and then be forced out into passageway 17 and through the slots 22. When the water reaches this point, it will be directed into the container 14 by gravity and by the presence of the paddle 13. The arrows shown in FIG. 5 clearly show this flow.

It is important that the opening 36 be located on the cylindrical member 33 at a point whereby the valve head 21 will pass directly and closely past it during the opening and the closing of the valve. This is important because of the loosely fitting valve stem 18 and will randomly cause a portion of the valve head 21 to rub against the inner portion of the cylindrical member 33 around the opening 36. This will tend to keep deposits from forming in the opening 36 as would be the case if such rubbing did not occur. Additionally, it is important that the opening 36 have a cross-sectional area substantially equal to the other smallest openings through the valve so as to have an even flow of water through the valve rather than to have a restriction at the opening 36 or at the portion of the passageway 26 surrounding the valve stem 18. Accordingly, it can be seen that the present invention constitutes a novel and unique valve which accomplishes the objects set forth above.

Obviously, many modifications and variations of the present invention are possible in light of the above teachings. It is therefore to be understood that, within the scope of the appended claims, the invention may be practiced otherwise than as specifically described.

We claim:

1. A valve comprising:
   a valve body having a fluid passageway therethrough said fluid passageway being disposed about a longitudinal axis, one end of said passageway formimg a fluid inlet port and the other end of said passageway forming an outlet port;
   a valve seat disposed at said one end of said passageway;
   a valve stem extending through said passageway;
   a valve head disposed on one end of said valve stem adjacent to said valve seat;
   means for biasing said valve stem to a first position whereby said valve head is in sealing engagement with said valve seat, said valve stem having a second position when said biasing means is overcome whereby the valve head is spaced from the valve seat to allow flow through the valve;
   screening means connected to said one end of said valve body and encompassing said valve head for filtering fluids passing through the valve, said screening means being substantially cylindrical and having sidewalls which are pervious to fluid flow and having one end wall which is impervious to fluid flow; and
   a cylindrical sleeve member disposed within said screening means, said cylindrical sleeve member having a single hole in the side thereof positioned directly adjacent to said valve head when said valve head is in said first position whereby said valve head will slide past said hole when moving between said first and second positions to prevent the buildup of mineral deposits in said hole, said cylindrical member having one end thereof in sealing engagement with said flow impervious one end of said screening means and the other end of said cylindrical member being in sealing engagement with a portion of said housing surrounding said valve seat, said hole being intermediate the ends of said cylindrical member.

2. A valve as defined in claim 1 wherein said valve stem is enlarged on the other end thereof and a plurality of longitudinal slots are formed along the entire length of the enlarged portion for allowing fluid flow therethrough, said passageway having a first portion which is slightly larger than a central portion of said stem and a second portion which is slightly larger than said enlarged portion, and said biasing means being a coil compression spring disposed in said second portion of the passageway surrounding said central portion of said valve stem and in abutment with said enlarged portion of the valve stem on one end thereof and in abutment with said valve body on the other end thereof.

* * * * *